United States Patent
Park et al.

(10) Patent No.: US 6,810,268 B2
(45) Date of Patent: Oct. 26, 2004

(54) SIGNAL POWER DETECTION DEVICE AND FREQUENCY ANALYSIS APPARATUS USING THE SAME

(75) Inventors: Shin Jae Park, Seoul (KR); Wook Hyun Lee, Seoul (KR)

(73) Assignee: Finedigital Inc. (KR)

( * ) Notice: Subject to any disclaimer, the term of this patent is extended or adjusted under 35 U.S.C. 154(b) by 0 days.

(21) Appl. No.: 10/346,791

(22) Filed: Jan. 17, 2003

(65) Prior Publication Data
US 2003/0157964 A1 Aug. 21, 2003

(30) Foreign Application Priority Data

Feb. 21, 2002 (KR) .......................................... 2002-9358
May 31, 2002 (KR) ........................................ 2002-30746

(51) Int. Cl.[7] ............................................... H04M 1/00
(52) U.S. Cl. ....................... 455/558; 455/67.1; 455/423
(58) Field of Search ............................... 455/67.1, 423, 455/424, 425, 115; 340/664; 324/73.1, 76.11; 330/296, 293

(56) References Cited

U.S. PATENT DOCUMENTS

| | | | | |
|---|---|---|---|---|
| 5,295,485 A | * | 3/1994 | Shinomura et al. | 600/443 |
| 6,104,304 A | * | 8/2000 | Clark et al. | 340/664 |
| 6,114,912 A | * | 9/2000 | Ashby et al. | 330/296 |
| 6,157,183 A | * | 12/2000 | Bradley | 324/76.23 |
| 6,587,671 B1 | * | 7/2003 | Kanago et al. | 324/158.1 |

* cited by examiner

Primary Examiner—Charles Appiah
Assistant Examiner—Joy K. Contee
(74) Attorney, Agent, or Firm—Perman & Green, LLP (57) ABSTRACT

A card-type signal power detection device which has a low-noise amplification function therein and is capable of receiving a low-power signal and detecting the power of the received signal, and a frequency analysis apparatus which is capable of analyzing the frequency of the received signal under the condition that the card-type signal power detection device is mounted to a portable terminal device. The signal power detection device includes a radio frequency amplification circuit for attenuating and low-noise amplifying input signals, an intermediate frequency amplification circuit for converting an output signal from the radio frequency amplification circuit into a desired intermediate frequency signal and detecting power of the converted intermediate frequency signal, a local signal generator for supplying to the intermediate frequency amplification circuit a frequency signal corresponding to the intermediate frequency signal, and a digital signal processor for digitizing the signal power detected by the intermediate frequency amplification circuit such that it is appropriate to an interface standard, outputting the digitized result to the portable terminal device via an interface and supplying a desired reference frequency to the local signal generator. The detection device is of a thin card type.

14 Claims, 8 Drawing Sheets

| FRAME NUMBER | SIGNAL FREQUENCY (MHz) | SIGNAL POWER VALUES (dBm) | |
|---|---|---|---|
| 1 | 1845.50 | -10 | ⎫ |
| 1 | 1845.55 | -9 | |
| 1 | 1845.60 | -9 | |
| 1 | 1845.65 | -11 | ⎬ FRAME 1 |
| ... | ... | ... | |
| 1 | 1861.45 | -10 | |
| 1 | 1861.50 | -11 | ⎭ |
| 2 | 1845.50 | -9 | ⎫ |
| 2 | 1845.55 | -10 | |
| 2 | 1845.60 | -9 | |
| 2 | 1845.65 | -10 | ⎬ FRAME 2 |
| ... | ... | ... | |
| 2 | 1861.45 | -11 | |
| 2 | 1861.50 | -10 | ⎭ |
| ... | ... | ... | |
| N | 1845.50 | -10 | ⎫ |
| N | 1845.55 | -10 | |
| N | 1845.60 | -9 | |
| N | 1845.65 | -10 | ⎬ FRAME N |
| ... | ... | ... | |
| N | 1861.45 | -9 | |
| N | 1861.50 | -9 | ⎭ |

Fig. 8

SIGNAL POWER DETECTION DEVICE AND FREQUENCY ANALYSIS APPARATUS USING THE SAME

BACKGROUND OF THE INVENTION

1. Field of the Invention

The present invention relates to a signal power detection device and a frequency analysis apparatus using the same, and more particularly to a card-type signal power detection device which has a low-noise amplification function therein and is capable of receiving a low-power signal and detecting the power of the received signal, and a frequency analysis apparatus which is capable of analyzing the frequency of the received signal under the condition that the card-type signal power detection device is mounted to a portable terminal device.

2. Description of the Related Art

Generally, in order to maintain the optimum propagation environment in a radio communication environment, base station and repeater operators have constructed and used apparatuses for frequency analyses of signals in a radio communication field.

It is common that such a signal frequency analysis is accomplished by the provision of a frequency analysis apparatus and a portable terminal device, such as a notebook computer, which is connected to the frequency analysis apparatus via a cable or the like and has a display unit for providing a visual indication of states analyzed by the frequency analysis apparatus. In this regard, it is difficult for only one person to conduct a system operation/maintenance with the above two units (frequency analysis apparatus and notebook computer) on the spot, so a duo generally conducts the system operation/maintenance with the two units on the spot. In particular, it is very dangerous for persons to get to and work upon a base station pylon with the two units as stated above.

Figure 1:
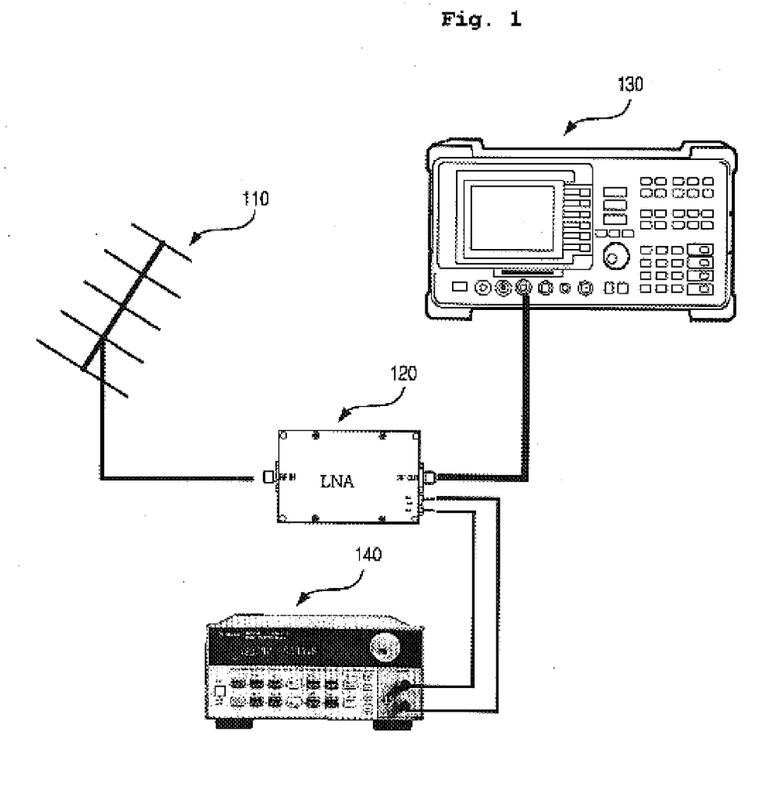
FIG. 1 is a view showing the construction of a conventional frequency analysis system for reverse signal analyses.

Moreover, in order to analyze a signal with very low power, a low-noise amplifier must be mounted to the frequency analysis apparatus in addition to existing equipment. In this case, a separate power supply is further required to supply power to the low-noise amplifier. Such a frequency analysis system comprises an antenna 110, a low-noise amplifier 120, a frequency analysis apparatus 130 and a power supply 140, as shown in FIG. 1.

Accordingly, for the purpose of analyzing the frequency of a received signal on the spot, operators have to carry many units such as the frequency analysis apparatus 130, low-noise amplifier 120, power supply 140, etc., thereby causing a degradation in working efficiency. Furthermore, many operators are required to perform the signal frequency analysis, resulting in an increase in maintenance costs.

Additionally, existing frequency analysis apparatuses have the disadvantage of being large in volume and weight in that they are provided with radio frequency (RF) modules and various functions. For this reason, such a frequency analysis apparatus is not appropriate to carry, although it is essential for the operation of a repeater or base station. Further, the frequency analysis apparatus is able to measure only high-level power. In this connection, a reverse mobile communication spurious component or a signal transmitted from a terminal to a base station must be received through an antenna, amplified through a low-noise amplifier and then analyzed by the frequency analysis apparatus. As a result, a large amount of equipment is required for the signal analysis, resulting in a degradation in mobility on the spot and an increase in maintenance costs.

SUMMARY OF THE INVENTION

Therefore, the present invention has been made in view of the above problems, and it is an object of the present invention to provide a card-type signal power detection device which has a low-noise amplification function therein and is capable of receiving a low-power signal and detecting the power of the received signal.

It is another object of the present invention to provide a frequency analysis apparatus which is capable of analyzing the frequency of the received signal under the condition that the above-mentioned card-type signal power detection device is mounted to a portable terminal device such as a notebook computer or a personal digital assistant (PDA), thereby securing mobility on the spot and reducing maintenance costs.

In accordance with one aspect of the present invention, the above and other objects can be accomplished by the provision of a signal power detection device comprising: radio frequency amplification means for attenuating and low-noise amplifying input signals; intermediate frequency amplification means for converting an output signal from the radio frequency amplification means into a desired intermediate frequency signal and detecting power of the converted intermediate frequency signal; local signal generation means for supplying to the intermediate frequency amplification means a frequency signal corresponding to the intermediate frequency signal whose power is to be detected; and digital signal processing means for digitizing the signal power detected by the intermediate frequency amplification means such that it is appropriate to an interface standard, outputting the digitized result to a portable terminal device connected thereto via an interface and supplying a desired reference frequency to the local signal generation means; the signal power detection device being of a thin card type such that it can be connected with the portable terminal device via a data interface slot.

In accordance with another aspect of the present invention, there is provided a frequency analysis apparatus comprising: a card-type signal power detection device for low-noise amplifying and filtering input signals to detect power of a signal corresponding to a desired frequency, among the input signals; and a portable terminal device connected with the card-type signal power detection device via a data interface slot for transferring a frequency command corresponding to the desired frequency to the signal power detection device, receiving the signal power, detected by the signal power detection device in response to the frequency command, storing the received signal power and displaying it on a screen. Preferably, the signal power detection device may include: radio frequency amplification means for attenuating and low-noise amplifying the input signals; intermediate frequency amplification means for converting an output signal from the radio frequency amplification means into a desired intermediate frequency signal and detecting power of the converted intermediate frequency signal; local signal generation means for supplying to the intermediate frequency amplification means a frequency signal corresponding to the intermediate frequency signal whose power is to be detected; and digital signal processing means for digitizing the signal power detected by the intermediate frequency amplification means such that it is appropriate to an interface standard, outputting the digitized result to the portable terminal device via an interface and supplying a desired frequency signal to the local signal generation means in response to the frequency command transferred from the portable terminal device.

More preferably, the signal power detection device may further include: a connector connected to an antenna for receiving an external signal through the antenna and transferring the received signal to the radio frequency amplification means; and signal shield means formed on an external surface thereof for shielding external signals.

Preferably, the interface standard may be a personal computer memory card international association (PCMCIA) standard, mini peripheral component interconnect (PCI) standard or universal serial bus (USB) standard.

Preferably, the portable terminal device may be selected from a group consisting of a personal digital assistant (PDA), a notebook computer and a Web pad.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 2:
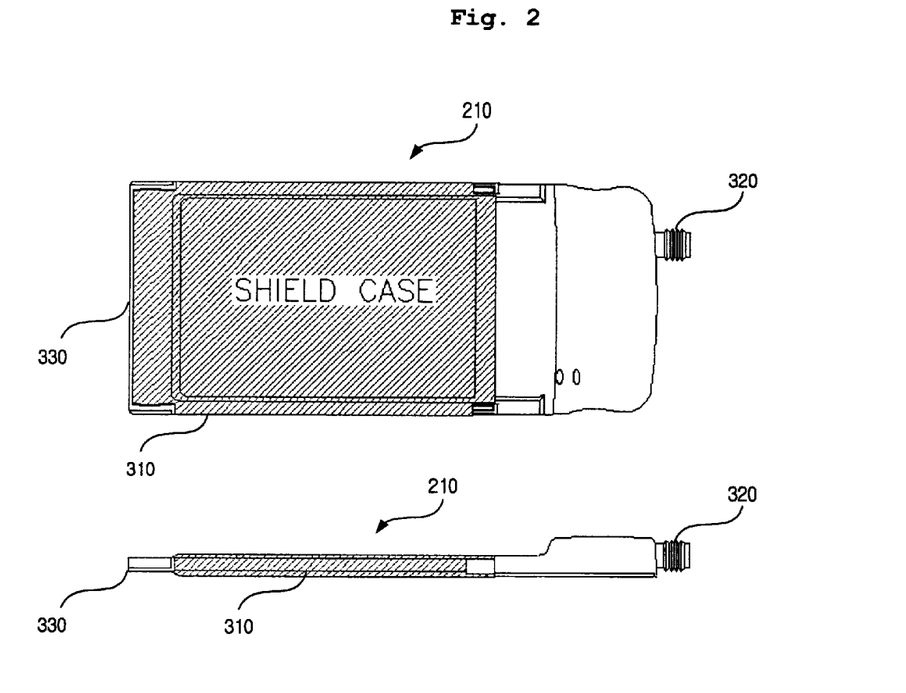
FIG. 2 is a top/side view showing the outer appearance of a preferred embodiment of a signal power detection device in accordance with the present invention.

FIG. 2 is a top/side view showing the outer appearance of a preferred embodiment of a signal power detection device in accordance with the present invention, which is denoted by the reference numeral 210.

As shown in FIG. 2, the signal power detection device 210 has an interface socket 330 installed at its one side in such a manner as to be mountable to an extension packet of a portable terminal device with a display unit, such as a notebook computer, PDA or Web pad, and connectable to a slot of the portable terminal device, a shield case 310 installed at its external surface for shielding unnecessary signals, and an SMA connector 320 installed at its other side for receiving an input signal from an antenna or an external input signal.

With the above construction, the signal power detection device 210 is capable of receiving a signal through the SMA connector 320 under no influence of external unnecessary signals, internally low-noise amplifying the received signal, detecting the power of the amplified signal, converting the detected power into a digital signal and transferring the converted digital signal to a portable terminal device, such as a notebook computer, PDA or Web pad, through an interface.

Figure 3:
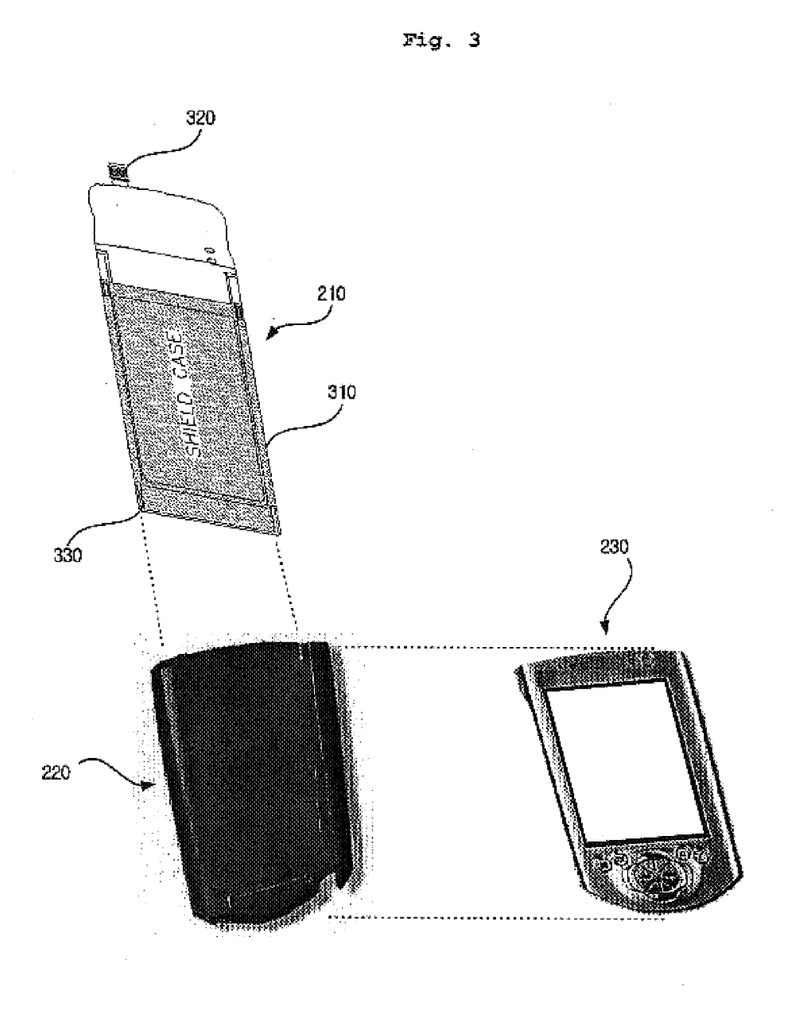
FIG. 3 is an exploded, perspective view showing an example of the construction of a frequency analysis apparatus according to the present invention, using the signal power detection device of FIG. 2.

FIG. 3 is an exploded, perspective view showing an example of the construction of a frequency analysis apparatus according to the present invention, using the signal power detection device of FIG. 2.

As shown in FIG. 3, the signal power detection device 210, which has the low-power signal reception/signal power detection function therein along with the low-noise amplification function, as described above, is mounted to an extension package 220 for connection with a portable terminal device 230 and then connected to the portable terminal device 230 via an interface. As a result, the signal power detection device 210, which is preferably of a card type, detects the power of a received signal, converts data about the detected power into a digital signal appropriate to an interface standard and transfers the converted digital signal to the portable terminal device 230. The portable terminal device 230 stores the power data transferred from the signal power detection device 210 in its internal memory and, meanwhile, displays the transferred power data on its screen through its internal signal processing operation. These operations will be described later in detail with reference to FIGS. 4 and 5.

On the other hand, although the portable terminal device coupled with the card-type signal power detection device is shown in FIG. 3 to be a PDA, it may be any other portable device having display means, such as a notebook computer, Web pad or so forth. Also, the signal power detection device and the portable terminal device may be interconnected in a personal computer memory card international association (PCMCIA), mini peripheral component interconnect (PCI) or universal serial bus (USB) manner.

Figure 4:
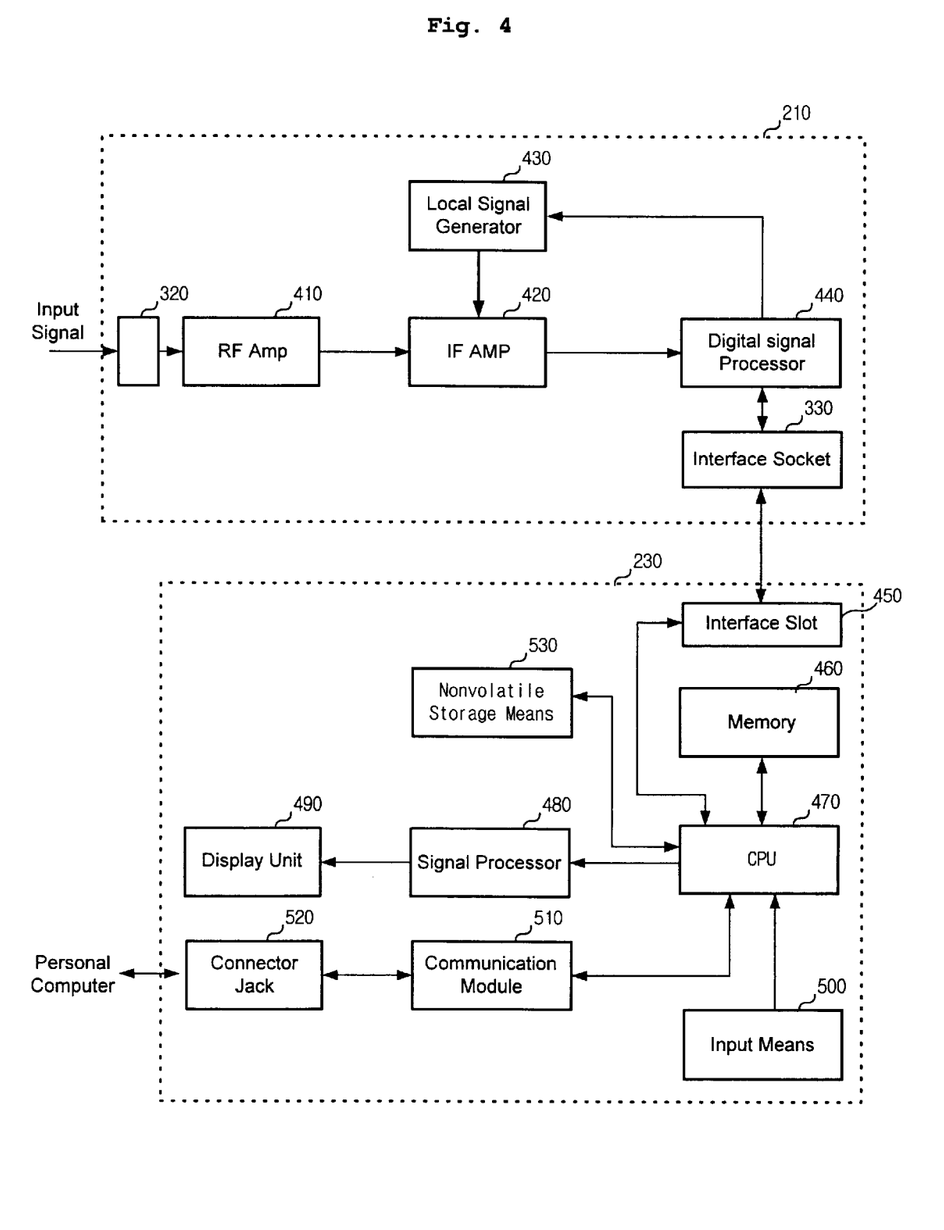
FIG. 4 is a block diagram of a preferred embodiment of the frequency analysis apparatus using the signal power detection device in accordance with the present invention.

FIG. 4 is a block diagram of a preferred embodiment of the frequency analysis apparatus using the signal power detection device in accordance with the present invention.

As shown in FIG. 4, the frequency analysis apparatus comprises the signal power detection device 210 and the portable terminal device 230.

The signal power detection device 210 includes the SMA connector 320, a radio frequency (RF) amplification circuit 410, an intermediate frequency (IF) amplification circuit 420, a local signal generator 430, a digital signal processor 440 and the interface socket 330.

The RF amplification circuit 410 performs a variable attenuation operation and low-noise amplification operation with respect to an RF signal received through, for example, an antenna connected to the SMA connector 320. The IF amplification circuit 420 converts an output signal from the RF amplification circuit 410 into an IF signal in response to a frequency signal supplied from the local signal generator 430 and detects the power of the converted IF signal. The local signal generator 430 frequency-divides a frequency signal supplied from the digital signal processor 440 to generate a high frequency signal, and supplies the generated high frequency signal to the IF amplification circuit 420. The digital signal processor 440 converts an output power signal from the IF amplification circuit 420 into a digital signal appropriate to, for example, a PCMCIA standard and outputs the converted digital signal through the interface socket 330. The digital signal processor 440 is also adapted to receive a frequency command from the portable terminal device 230, convert the received frequency command into frequency information and transfer the converted frequency information to the IF amplification circuit 420.

The portable terminal device 230 basically includes an interface slot 450, a central processing unit (CPU) 470, a memory 460, a signal processor 480, a display unit 490 and input means 500. The portable terminal device 230 further includes a communication module 510 and connector jack 520 for connection with an external personal computer, and nonvolatile storage means 530 for securely storing data. The input means 500 includes function key buttons and a touch panel in the case where the portable terminal device 230 is a PDA, and a keyboard and mouse in the case where the portable terminal device 230 is a notebook computer.

If an operator, through the input means 500, inputs and sets frequency band information (for example, a center frequency and a frequency span range) and analysis time information of a signal whose frequency is to be analyzed, from among signals received by the signal power detection device 210, the CPU 470 generates a frequency command based on the inputted and set information and transfers the generated frequency command to the signal power detection device 210 via the interface slot 450.

The CPU 470 receives power data, detected by the signal power detection device 210 in response to the above frequency command, and stores the received power data and corresponding frequency data in the memory 460. The CPU 470 also outputs the stored frequency data and power data to the signal processor 480 on a frame basis. The signal processor 480 performs a signal processing operation with respect to the frequency data and power data from the CPU 470 and outputs the resulting data to the display unit 490 so that detected power values within a desired frequency band are displayed on the display unit 490. Here, one frame is composed of signal power data detected by once scanning frequencies within a frequency band determined depending on the frequency band information (center frequency and frequency span range) inputted and set through the input means.

The CPU 470 further controls the communication module 510 according to settings inputted through the input means 500 to set a communication mode with an external device, for example, a personal computer, so as to enable communication with the personal computer via the connector jack 520.

Figure 5:
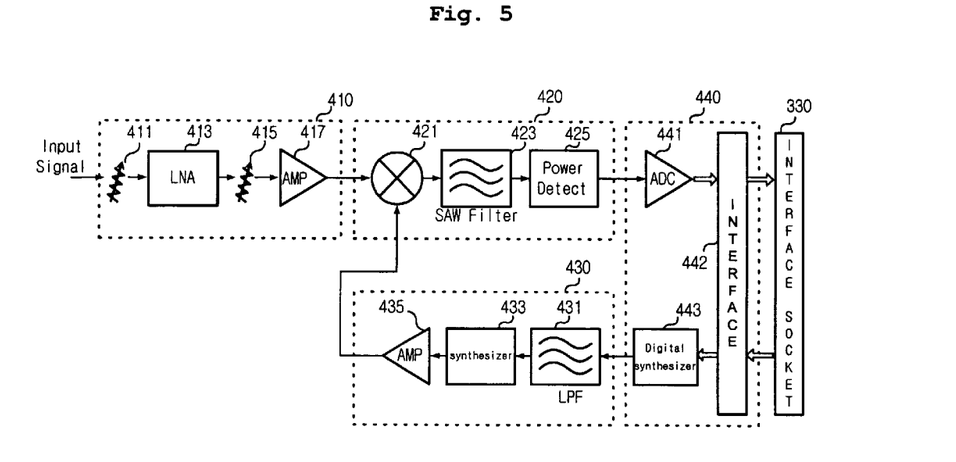
FIG. 5 is a detailed block diagram of the signal power detection device in FIG. 4.

FIG. 5 is a detailed block diagram of the signal power detection device in FIG. 4.

As shown in FIG. 5, the RF amplification circuit 410 includes first and second signal attenuators 411 and 415, a low noise amplifier (LNA) 413 and an amplifier 417. The IF amplification circuit 420 includes a signal mixer 421, a surface acoustic wave (SAW) filter 423 and a power detector 425. The digital signal processor 440 includes an analog/digital converter (ADC) 441, an interface 442 and a digital frequency synthesizer 443. The local signal generator 430 includes a low pass filter (LPF) 431, an analog frequency synthesizer 433 and an amplifier 435.

In the RF amplification circuit 410, an RF input signal received through the SMA connector 320 is attenuated by the first attenuator 411, low-noise amplified by the low-noise amplifier 413, re-attenuated by the second attenuator 415 and then amplified by the amplifier 417. Here, the first and second attenuators 411 and 415 are installed to attenuate the level of an input signal so as to protect an input stage and provide a signal of a proper level to a subsequent stage.

In the IF amplification circuit 420, the signal amplified by the amplifier 417 in the RF amplification circuit 410 is inputted to the signal mixer 421, which then mixes the amplified signal with a local signal from the local signal generator 430 to output a desired IF signal. The output signal from the signal mixer 421 is filtered by the SAW filter 423 and then inputted to the power detector 425. The power detector 425 performs a frequency matching operation with respect to the IF signal filtered by the SAW filter 423 to convert the power level of the filtered IF signal into a DC level.

In the digital signal processor 440, output signal power data from the power detector 425 in the IF amplification circuit 420 is converted into digital power data by the analog/digital converter 441 and then transferred to the portable terminal device 230 (see FIG. 4) via the interface 442 and interface socket 330. Here, the interface 442 acts to convert the digital power data from the analog/digital converter 441 into a format appropriate to a communication standard with the portable terminal device 230. Provided that the signal power detection device 210 and the portable terminal device 230 are interconnected in, for example, a PCMCIA manner, the interface 442 converts the digital power data from the analog/digital converter 441 into a PCMCIA-type data format and transfers the resulting digital power data to the portable terminal device 230.

In the portable terminal device 230, the CPU 470 receives the digital power data from the signal power detection device 210 via the interface slot 450 and stores the received digital power data in the memory 460. The CPU 470 then reads the digital power data stored in the memory 460 on a frame basis and outputs the read data to the display unit 490 via the signal processor 480 to display it on the screen of the display unit 490.

On the other hand, the portable terminal device 230 has a frequency analysis program for execution of the entire frequency analysis function including the function of allowing the operator to input and set through the input means 500 frequency information (for example, a center frequency and a frequency span range) and power detection time information of a signal whose power is to be detected by the signal power detection device 210, and the function of displaying signal power values detected by the signal power detection device 210 on the screen according to the frequency information.

Figure 6:
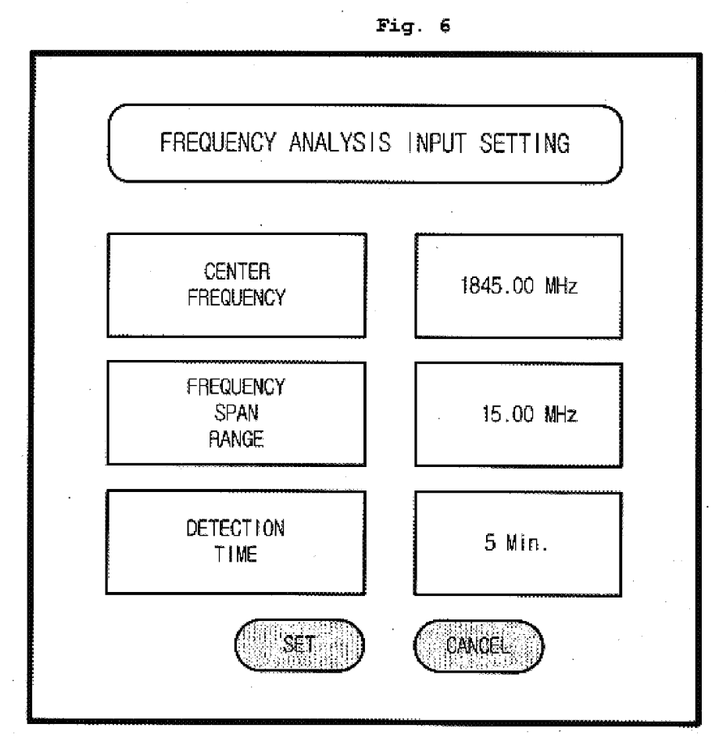
FIG. 6 is a view showing an example of a frequency analysis input setting picture which is displayed for frequency analyses on the screen of a portable terminal device employed in the frequency analysis apparatus of the present invention.

For example, in the case where the operator runs the frequency analysis program and inputs and sets the center frequency to 1845.00 MHz, the frequency span range to 15.00 MHz and the detection time to 5 minutes, respectively, in a frequency analysis input setting picture as shown in FIG. 6, the CPU 470 sequentially generates frequency commands corresponding respectively to signal frequencies to be measured on the basis of the set frequency information (center frequency and frequency span range) and outputs the generated frequency commands to the signal power detection device 210 via the interface slot 450. In this case, because the center frequency is set to 1845.00 MHz and the frequency span range is set to 15.00 MHz, the CPU 470 sequentially generates corresponding frequency commands while incrementing signal frequencies to be measured, for example, from 1846.50 MHz to 1861.50 MHz by 0.05 MHz.

Upon receiving a frequency command from the CPU 470 via the interface socket 330 and interface 442, the digital frequency synthesizer 443 analyzes the received frequency command, generates a digital pulse signal corresponding thereto as a result of the analysis and converts the generated digital pulse signal into an analog signal.

The digital frequency synthesizer 443 includes a reference clock source, preferably a voltage controlled temperature compensated X-tal oscillator (VCTCXO), for generating a reference clock for generation of the digital pulse signal. Alternatively, the digital frequency synthesizer 443 may receive a reference clock from a base station, which is generated on the basis of a signal received from a global positioning system (GSP), and generate the digital pulse signal on the basis of the received reference clock.

The frequency command provided from the CPU 470 includes a specific frequency code corresponding to an associated frequency. In this regard, the digital frequency synthesizer 443 analyzes the frequency code of the frequency command to generate a digital pulse signal corresponding to the frequency code. This digital pulse signal is converted into an analog signal, filtered by the low pass filter 431 and then applied to the analog frequency synthesizer 433.

The analog frequency synthesizer 433, for example, 1/n-divides the frequency of an input signal, and the amplifier 435 amplifies the frequency-divided signal and transfers the amplified signal to the signal mixer 421. That is, the analog frequency synthesizer 433 1/n-divides the frequency of the pulse signal from the digital frequency synthesizer 443. This 1/n-divided frequency is the same as an actual frequency corresponding to the specific frequency code generated by the CPU 470.

In the IF amplification circuit 420, only a signal corresponding to the frequency signal from the local signal generator 430 is extracted from among output signals from the RF amplification circuit 410 by the signal mixer 421 and SAW filter 423. Then, the power detector 425 detects the power of the signal corresponding to the frequency signal from the local signal generator 430 and outputs a gain value of the detected power. This power gain value is converted into a digital signal by the analog/digital converter 441 in the digital signal processor 440 and then inputted to the CPU 470 in the portable terminal device 230 via the interface 442, interface socket 330 and interface slot 450. The CPU 470 stores the inputted signal power gain value and a frequency value corresponding thereto in the memory 460.

In this manner, for example, if the center frequency is set to 1845.00 MHz and the frequency span range is set to 15.00 MHz, the CPU 470 sequentially generates corresponding frequency commands while incrementing signal frequencies to be measured, for example, from 1846.50 MHz to 1861.50 MHz by 0.05 MHz (i.e., 1846.50 MHz, 1846.55 MHz, 1846.60 MHz, 1846.65 MHz, 1846.70 MHz, . . . , 1861.40 MHz, 1861.45 MHz, 1861.50 MHz), receives power gain values of input signals corresponding respectively to frequencies of the generated frequency commands, detected by the signal power detection device 210 in response to those frequency commands, and sequentially stores the frequencies of the generated frequency commands and the detected power gain values in the memory 460 in a matched manner. At the moment that the last frequency command reaches an upper limited frequency (1861.50 MHz in the above example), the CPU 470 generates and outputs frequency commands again beginning with a lower limited frequency (1846.50 MHz in the above example). This procedure is repeated for the above set period of time (for example, 5 minutes). Here, signal power gain values sequentially detected once from the lower limited frequency to the upper limited frequency constitute one frame displayed on the screen of the display unit 490.

Figure 7:
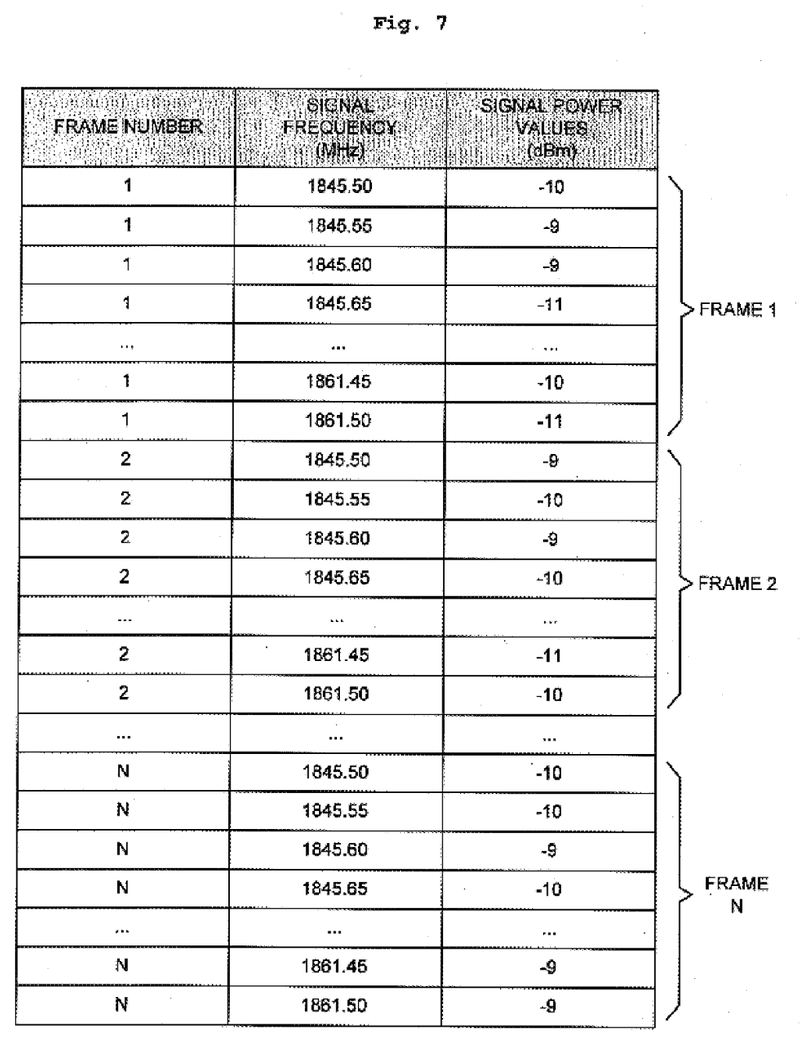
FIG. 7 is a table showing signal power values-by-signal frequencies, detected by the signal power detection device in the frequency analysis apparatus of the present invention and then stored in a memory of the portable terminal device.
Figure 8:
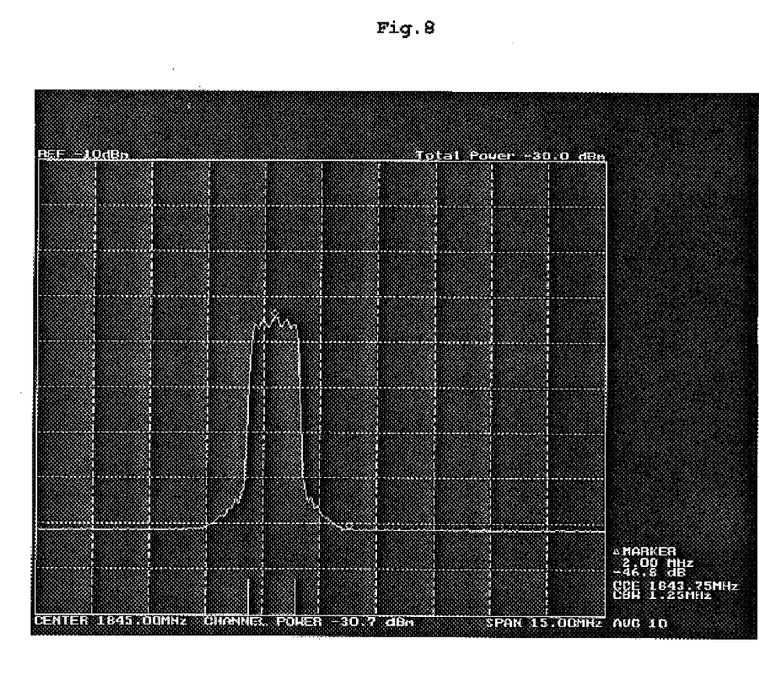
FIG. 8 is a graph showing data, stored in the memory of the portable terminal device in the frequency analysis apparatus of the present invention and then displayed through a display unit of the portable terminal device.

The contents stored in the memory 460, including the signal power gain values detected in the above manner, are illustrated in FIG. 7 in a table form. The signal frequencies and signal power gain values as shown in FIG. 7 are read on a frame basis from the memory 460 by the CPU 470 and then transferred to the display unit 490 through the signal processor 480. As a result, the signal power gain values sequentially detected according to the signal frequencies on a frame basis are displayed on the screen of the display unit 490, for example, in a graph form as shown in FIG. 8.

A plurality of functions may be further provided to process data in the above graph in various forms according to the operator's selections. Such functions may be, for example, a function of selecting a specific portion of the graph and confirming a frequency value and signal power level in the selected portion, a function of selecting two specific portions of the graph and confirming a frequency difference and signal power level difference in the selected portions, a function of confirming the average value, maximum value and minimum value of power displayed on the screen, a function of storing data (frequencies and signal power levels) constituting the graph in the nonvolatile storage means 530, a function of erasing data (frequencies and signal power levels) stored in the nonvolatile storage means 530, a function of capturing an image of the graph displayed on the screen of the display unit 490 and storing the captured image in the nonvolatile storage means 530, and a function of sending data (including frequencies and signal power levels) stored in the memory 460 or nonvolatile storage means 530 to an external device, for example, a personal computer via the communication module 510 and connector jack 520.

The data (including frequencies and signal power levels) stored in the memory 460 and nonvolatile storage means 530 can be provided to be confirmed later according to the operator's selection. The storage function and image capture function are performed such that the operator can confirm signal power levels measured on the spot together with other operators after returning to his/her office. Preferably, the nonvolatile storage means 530 may be a memory module composed of a nonvolatile memory, such as an electrically erasable and programmable read only memory (EEPROM) or flash memory, in the case where the portable terminal device 230 is a PDA, and be a hard disk or floppy disk in the case where the portable terminal device 230 is a notebook computer.

As apparent from the above description, according to the present invention, a frequency analysis apparatus, a low noise amplifier, etc., conventionally carried by a base station operator, can be installed in a portable terminal device such as a PDA or notebook, resulting in a significant reduction in equipment burden. Further, a low-power signal analysis function can be provided in the portable terminal device so that the operator can simply and conveniently analyze a low-power signal without installing separate equipment.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A signal power detection device comprising:

radio frequency amplification means for attenuating and low-noise amplifying input signals;

intermediate frequency amplification means for converting an output signal from said radio frequency amplification means into a desired intermediate frequency signal and detecting power of the converted intermediate frequency signal;

local signal generation means for supplying to said intermediate frequency amplification means a frequency signal corresponding to said intermediate frequency signal whose power is to be detected; and digital signal processing means for digitizing said signal power detected by said intermediate frequency amplification means such that it is appropriate to an interface standard, outputting the digitized result to a portable terminal device connected thereto via an interface and supplying a desired reference frequency to said local signal generation means;

said signal power detection device being of a thin card type such that it can be connected with said portable terminal device via a data interface slot.

2. The signal power detection device as set forth in claim 1, further comprising a connector connected to an antenna for receiving an external signal through said antenna and transferring the received signal to said radio frequency amplification means.

3. The signal power detection device as set forth in claim 1, further comprising signal shield means formed on an external surface thereof for shielding external signals.

4. The signal power detection device as set forth in claim 1, wherein said interface standard is a personal computer memory card international association (PCMCIA) standard.

5. The signal power detection device as set forth in claim 1, wherein said interface standard is a mini peripheral component interconnect (PCI) standard.

6. The signal power detection device as set forth in claim 1, wherein said interface standard is a universal serial bus (USB) standard.

7. The signal power detection device as set forth in claim 1, wherein said portable terminal device is selected from a group consisting of a personal digital assistant (PDA), a notebook computer and a Web pad.

8. A frequency analysis apparatus comprising:

a card-type signal power detection device, comprising:

radio frequency amplification means for attenuating and low-noise amplifying said input signals;

intermediate frequency amplification means for converting an output signal from said radio frequency amplification means into a desired intermediate frequency signal and detecting power of the converted intermediate frequency signal;

local signal generation means for supplying to said intermediate frequency amplification means a frequency signal corresponding to said intermediate frequency signal whose power is to be detected;

digital signal processing means for digitizing said signal power detected by said intermediate frequency amplification means such that it is appropriate to an interface standard, outputting the digitized result to said portable terminal device via an interface and supplying a desired frequency signal to said local signal generation means in response to said frequency command transferred from said portable terminal device; and a portable terminal device connected with said card-type signal power detection device via a data interface slot for transferring a frequency command corresponding to said desired frequency to said signal power detection device, receiving said signal power, detected by said signal power detection device in response to said frequency command, storing the received signal power and displaying it on a screen.

9. The frequency analysis apparatus as set forth in claim 8, wherein said signal power detection device further includes a connector connected to an antenna for receiving an external signal through said antenna and transferring the received signal to said radio frequency amplification means.

10. The frequency analysis apparatus as set forth in claim 8, wherein said signal power detection device further includes signal shield means formed on an external surface thereof for shielding external signals.

11. The frequency analysis apparatus as set forth in claim 8, wherein said interface standard is a PCMCIA standard.

12. The frequency analysis apparatus as set forth in claim 8, wherein said interface standard is a mini PCI standard.

13. The frequency analysis apparatus as set forth in claim 8, wherein said interface standard is a USB standard.

14. The frequency analysis apparatus as set forth in claim 8, wherein said portable terminal device is selected from a group consisting of a PDA, a notebook computer and a Web pad.

* * * * *